Patented May 15, 1945

2,375,987

UNITED STATES PATENT OFFICE 2,375,987

POLYMERIZATION OF CONJUGATED DIENES

Benjamin S. Garvey, Jr., Akron, Ohio, assignor to The B. F. Goodrich Company, New York, N. Y., a corporation of New York No Drawing. Application June 26, 1941,
Serial No. 399,933

9 Claims. (Cl. 260—84.5)

This invention relates to the polymerization of unsaturated organic compounds, particularly butadienes and mixtures of butadienes with other unsaturated compounds copolymerizable therewith. More specifically, this invention relates to a novel process whereby unsaturated compounds are polymerized in presence of substances which initiate the polymerization, and to the improved rubber-like or resinous products thereby obtained.

It is well known that the conditions such as time and temperature which are necessary for linear polymerizations, and the quality and usefulness of the polymers produced are determined largely by the nature of the substances present along with the monomeric materials during the polymerization process. In practically all linear polymerizations, for example, whether carried out in a homogeneous system or in emulsion, the presence of an initiator of polymerization, that is, a substance which by some chemical action causes the polymerization to begin, is essential to completion of the process in a reasonably short time and at a reasonably low temperature. Oxygen-containing compounds such as hydrogen peroxide, benzoyl peroxide, and per-salts have heretofore been almost universally employed for this purpose. When such oxygen-containing initiators are used, however, these compounds may also function to oxidize the linear polymer as it is produced and thereby increase its degree of cross-linking or decrease its chain length, both of which are extremely undesirable because of their deleterious effect on the properties of the polymer. In the polymerization of butadienes or monomer mixtures containing a butadiene to form rubber-like polymers or copolymers, it is especially important that the product be substantially free of cross-linked structures since these render the polymers hard and unworkable. Accordingly, for many purposes, it is desirable to utilize compounds other than oxygen-containing compounds as initiators of polymerization. The principal object of this invention is to provide such new initiators.

In accordance with this invention, aryl azo triaryl methane type compounds are employed as initiators for the polymerization of butadienes or monomer mixtures containing a butadiene. These new initiators enable polymerizations to be carried out in good yield in a relatively short time and at a low temperature and also improve the plasticity, tackiness, and workability of polymers formed in their presence over those prepared using the known initiators.

The aryl azo triaryl methane initiators of this invention are compounds having the chemical structure

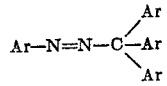

where Ar is an aryl group. Compounds of the above general formula containing aryl groups having substituents which are essentially unreactive in character and which therefore do not interfere with the polymerization such as halogen, ether, or sulfonic acid groups may also be used, hence it is to be understood that the term "aryl" unless otherwise limited is employed in a generic sense to designate groups which are typically aromatic in character whether or not they contain such essentially unreactive substituents. Compounds containing reactive substituents such as hydroxyl, thiol, and amino groups are not included since these compounds are materially altered in their properties and reactions by the presence of the reactive substituent, in many cases the reactive substituent so changing the nature of the compound and so interfering with its function in polymerization as to make it, instead of a polymerization initiator, a polymerization inhibitor.

Typical examples of the aryl azo triaryl methane initiators of this invention are phenyl azo triphenyl methane, chlorophenyl azo triphenyl methane, triphenyl methyl azo benzene-sulfonic acid, naphthyl azo triphenyl methane, xylyl azo triphenyl methane, anthracyl azo triphenyl methane, phenanthryl azo triphenyl methane, biphenyl azo triphenyl methane, triphenyl methyl azo phenetole, phenyl azo tri-o-tolyl methane, phenyl azo trichlorophenyl methane, phenyl azo trinaphthyl methane and the like. The preferred compounds are the aryl azo triphenyl methanes since these are relatively cheap and easy to obtain and also give good results. Phenyl azo triphenyl methane, for example, is especially preferred.

The initiators of this invention may be employed in the polymerization of any monomeric material which is composed wholly or in part of a butadiene, by which is meant butadiene-1,3 and its homologs and analogs which polymerize in essentially the same manner such as isoprene, 2,3-dimethyl butadiene, piperylene, chloroprene, and the like. Thus the monomeric material may be a butadiene by itself, a mixture of butadienes or a mixture containing one or more butadienes and one or more other unsaturated compounds which are polymerizable with butadienes. Such other unsaturated compounds, or comonomers, are, in general, unsaturated organic compounds containing the polymerizable structure

where at least one of the dangling valences is connected to an electron attracting group, that is, a group which substantially increased the electrical dissemetry or polar character of the compound. Among such comonomers there may be mentioned aryl olefins such as styrene, vinyl naphthalene and their chloro or alkoxy substituted derivatives; alpha methylene carboxylic acids and their esters, nitriles, amides and the like such as acrylic acid, methacrylic acid, methyl acrylate, methyl methacrylate, ethyl methacrylate, methyl ethacrylate, butyl acrylate, isobutyl methacrylate, acrylonitrile, methacrylonitrile, ethacrylonitrile, acryl amide, methacrylamide, and the like and other unsaturated comonomers such as vinylidene chloride, methyl vinyl ether, methyl vinyl ketone, vinyl ethinyl alkyl carbinols, isobutylene and other unsaturated hydrocarbons, esters, ketones, acids, alcohols, ethers and the like. Although the initiators of this invention are useful when polymerizing any monomeric mixture essentially containing a butadiene they are especially useful when polymerizing monomeric materials consisting predominantly of a butadiene, since such polymerizations yield a synthetic rubber-like material.

In the practice of this invention the monomeric material is polymerized by well known methods of polymerization such as by polymerization in homogeneous systems or by polymerization in aqueous emulsion in presence of small amounts of the initiators hereinabove disclosed. In the emulsion polymerization process, which is at present preferred, the monomeric material is emulsified with water by the use of a suitable emulsifying agent and polymerization is then effected by adding the initiator and agitating the emulsion at a temperature from about 20° to 50° C. until polymer is formed, this usually requiring from about 10 to 100 hours. Suitable emulsifying agents are, for example, fatty acid soaps such as sodium oleate, sodium myristate or the like and synthetic saponaceous materials such as sodium lauryl sulfate, sodium isobutyl naphthalene sulfonate, or the like.

The amount of aryl azo triaryl methane initiator which is used in the polymerization process may be varied over a wide range and is not critical. For most purposes, however, amounts varying from 0.2 to 2% of the initiator based upon the total weight of the monomeric material being polymerized are most effective. When the initiator is employed in this amount the polymerization is carried out in good yield and high quality products are obtained.

As an example of one embodiment of this invention a mixture of 70 parts of butadiene-1,3 and 30 parts of styrene is emulsified in 250 parts of an aqueous soap solution containing 2% of sodium palmitate as the emulsifying agent. To this emulsion 0.5 part of phenyl azo triphenyl methane is added and the emulsion is polymerized by agitation for 83½ hours at a temperature of 40° C. A 95% yield of a plastic coherent rubber-like copolymer is obtained. When the above experiment is repeated without using the phenyl azo triphenyl methane, 133 hours are required to produce a low yield of an inferior product.

A similar experiment using hydrogen peroxide as the initiator yields a rubber-like polymer which is hard and difficult to mill.

In another example the above experiment is repeated except that the amount of phenyl azo triphenyl methane is increased to 1.0 part. The resulting rubber-like polymer is equally soft and tacky and in addition it yields, when vulcanized, vulcanizates having improved tensile strength and elongation.

Similar results may be obtained by the use of other aryl azo triaryl methane initiators and when polymerizing other monomeric materials. In addition, it is to be understood that many other substances may be employed in the polymerization recipe without altering the effect of the initiators herein disclosed. Thus, modifiers of polymerization, accelerators of polymerization, catalysts of polymerization and other initiators of polymerization may be added together with the monomeric materials and the initiators of this invention if desired, the effect being that each substance added functions in its own way to improve the process or the products. It is also to be understood that the method and conditions of polymerization may be varied. Accordingly, the invention is not intended to be limited except by the spirit and scope of the appended claims.

I claim:

1. The method of polymerizing a monomeric material essentially containing a conjugated butadiene which comprises carrying out the polymerization in presence of an aryl azo triaryl methane wherein the aryl groups contain no substituents other than halogen, ether and sulfonic acid groups.

2. The method of polymerizing a monomeric mixture containing a conjugated butadiene and at least one other unsaturated organic compound polymerizable under the same conditions, which comprises carrying out the polymerization in presence of an aryl azo triaryl methane wherein the aryl groups contain no substituents other than halogen, ether and sulfonic acid groups.

3. The method of polymerizing a monomeric mixture containing a conjugated butadiene and an aryl olefin which comprises carrying out the polymerization in presence of an aryl azo triaryl methane wherein the aryl groups are unsubstituted hydrocarbon aryl groups.

4. The method of polymerizing a monomeric mixture containing a conjugated butadiene and an alpha methylene carboxylic acid nitrile which comprises carrying out the polymerization in presence of an aryl azo triaryl methane wherein the aryl groups are unsubstituted hydrocarbon aryl groups.

5. The method of polymerizing a monomeric mixture containing a conjugated butadiene and an alpha methylene carboxylic acid ester which comprises carrying out the polymerization in presence of an aryl azo triaryl methane wherein the aryl groups are unsubstituted hydrocarbon aryl groups.

6. The method of copolymerizing a conjugated butadiene with at least one other unsaturated organic compound which is polymerizable under the same conditions and which contains a

group, which comprises carrying out the polymerization in presence of an aryl azo triphenyl methane wherein the aryl group contains no substituents other than halogen, ether and sulfonic acid groups.

7. The method of polymerizing a monomeric mixture of butadiene-1,3 and styrene which comprises carrying out the polymerization in presence of phenyl azo triphenyl methane.

8. The method of polymerizing a monomeric mixture of butadiene-1,3 and acrylonitrile which comprises carrying out the polymerization in presence of phenyl azo triphenyl methane.

9. The method of polymerizing a monomeric mixture of butadiene-1,3 and methyl methacrylate which comprises carrying out the polymerization in presence of phenyl azo triphenyl methane.

BENJAMIN S. GARVEY, Jr.